United States Patent [19]

Corley et al.

[11] 4,273,481

[45] Jun. 16, 1981

[54] HYDRAULIC STOP

[75] Inventors: John E. Corley, St. Charles; Joseph M. Mitchell, Marthasville; Charles M. Andert, Florissant, all of Mo.

[73] Assignee: McDonnell Douglas Corporation, Long Beach, Calif.

[21] Appl. No.: 104,076

[22] Filed: Dec. 17, 1979

[51] Int. Cl.³ .......................................... B23B 47/24
[52] U.S. Cl. ..................................... 408/14; 408/12; 408/130
[58] Field of Search ...................... 408/12, 11, 14, 73, 408/74, 112, 130

[56] References Cited

U.S. PATENT DOCUMENTS

| | | | |
|---|---|---|---|
| 2,796,161 | 6/1957 | Graybill | 408/14 |
| 2,869,403 | 1/1959 | Bent | 408/130 |
| 2,883,891 | 4/1959 | Shulters et al. | 408/130 |
| 2,884,819 | 5/1959 | Roubloff | 408/130 |
| 2,994,235 | 8/1961 | Rise | 408/130 |
| 3,060,772 | 10/1962 | Crump | 408/202 |
| 3,762,827 | 10/1973 | Ziegelmeyer | 408/14 |

*Primary Examiner*—Leonidas Vlachos
*Attorney, Agent, or Firm*—John P. Scholl; Walter J. Jason; Donald L. Royer

[57] ABSTRACT

An automatic hydraulic stop for use with a numerical control machine and cutting tool. The stop senses the distance to a work piece, limits the depth of penetration of the tool into a work piece and provides protection for inadvertent travel of spindle of the numerical control machine beyond a projected point.

4 Claims, 5 Drawing Figures

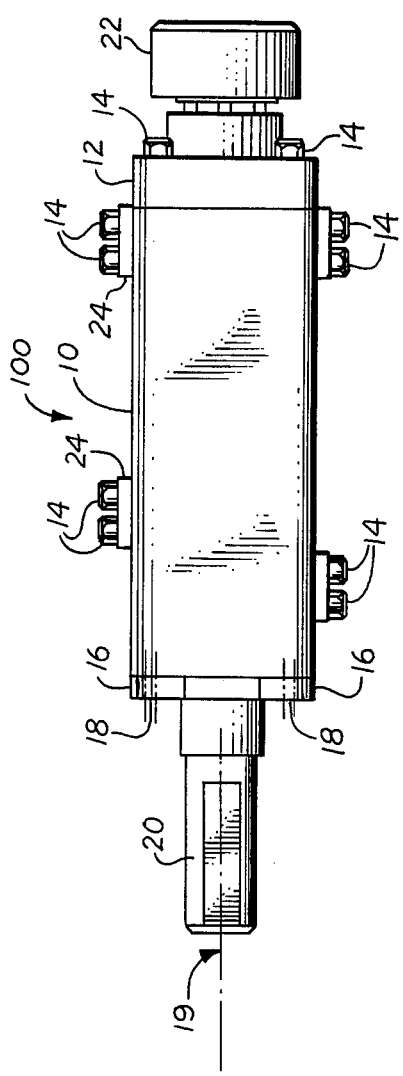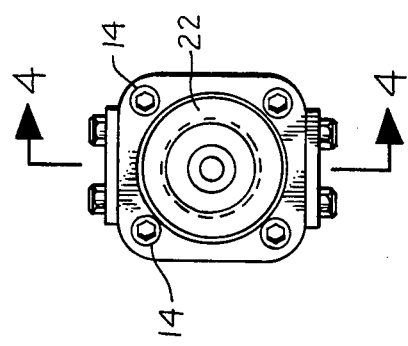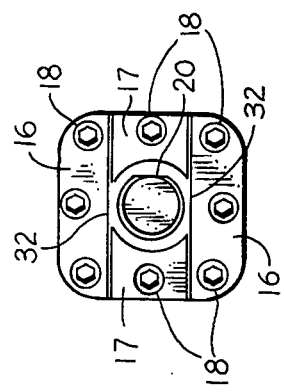

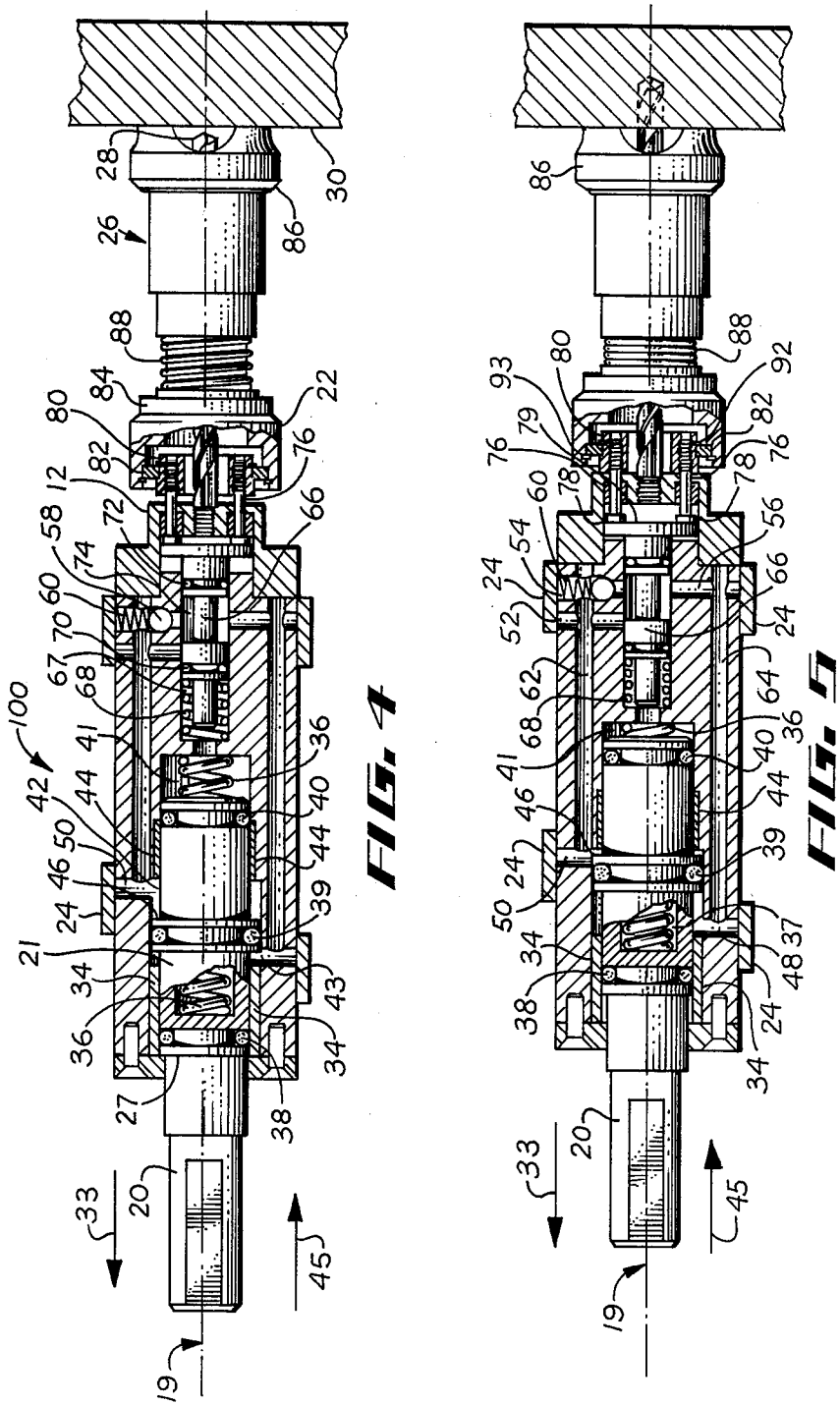

HYDRAULIC STOP

BACKGROUND OF THE INVENTION

Numerical control machines are designed to automatically perform milling, grinding and drilling operations. In some operations a numerical machine may drill or countersink. In others operations the drilling and countersinking of a hole may be in a single step. The inventive hydraulic stop may be used in a drilling operation, a countersinking operation or a combined drilling-/countersinking operation. The inventive hydraulic stop is specifically designed to be used where the true location of a surface is unknown with respect to the program start point of a numerical control machine. If the true location of the work surface is not known, in some cases to 0.01 inch (0.0254 centemeter), then the depth of the hole or the depth of the countersink may not be within the tolerance required. Further, if the true location of the surface of the part is unknown, with respect to the program start point, the spindle of the numerical control machine may override beyond the expected stroke causing damage to the machine, part, or holding fixture.

The present invention is a self-contained automatic hydraulic stop which will act as a sensor and determine the true location of the surface of a work piece, permit accurate drilling or countersinking to a predetermined depth, provide protection for accidental spindle override to prevent damage to the tool, part, and holding fixture and reset itself without operator assistance for next operation.

SUMMARY OF THE INVENTION

The present invention is a self-contained hydraulic stop which attaches between the spindle of a numerical control machine and a drill bit, or countersink, and provides the interconnection between the drill bit or countersink and the numerical control machine. When the numerical control machine begins its operation the hydraulic stop provides rotary motion and hydraulic stiffening between the numerical control machine and the cutting tool. The stop senses the exact location of the part, permits cutting of the work piece to a predetermined depth and then releases the hydraulic fluid under pressure to provide a discontinuity between the numerical control machine and the cutting tool and thereby limits the penetration of the work piece by the cutting tool to the predetermined depth. The release of the hydraulic fluid under pressure also prevents damage to the tool, part, and holding fixture by reason of inadvertent spindle override and permits the numerical control machine head to go to the location it has been programmed to go to.

Once the cutting operation has been completed, and as the spindle of the numerical control machine is being retracted, the hydraulic stop automatically resets itself for a next operation and again establishes the hydraulic stiffening between the spindle and the cutting tool in preparation for the next cutting operation.

BRIEF DESCRIPTION OF THE DRAWINGS

FIG. 1 is an elevation view of the hydraulic stop of the present invention.

FIG. 2 is a left-side elevation view of the hydraulic stop of FIG. 1.

FIG. 3 is a right-side elevation of the hydraulic stop of FIG. 1.

FIG. 4 is a section through the hydraulic stop of FIG. 3 along the section lines 4—4 of FIG. 3 with a drilling tool and extension element mounted on the right-hand end of the hydraulic stop prior to drilling operations.

FIG. 5 is a section view of the hydraulic stop of FIG. 4 following the completion of drilling operation with the hydraulic stop in the relief position.

DESCRIPTION OF PREFERRED EMBODIMENT

In FIG. 1 the hydraulic stop 100 of the present invention is depicted with a central body 10 and a right-hand end cap 12 held to the body 10 by bolts 14. The left-hand end caps 16 and end pieces 17 are held to the body by screws 18. The body 10 has an axis of rotation 19 which is coincident with the axis of rotation of driver 20. The driver 20 is coupled on the left end to the spindle of the numerical control machine (not shown). On the right-hand end of driver 20 is a piston 21 (FIG. 4).

Valve spool actuator 22 is located on the right-hand end of the hydraulic stop 100. On the top and bottom of the body 10 are cover plates 24 which are held to the body by bolts 14.

In FIG. 4, a section through the hydraulic stop of the present invention along the lines 4—4 of FIG. 3, a collapsible extension element 26 and drill bit 28 are shown. The extension element 26 has contacted work piece 30 to be drilled. The extension element 26 is threaded into the valve spool actuator 22. The drill bit 28 is threaded into the right-hand end cap 12.

In FIG. 4 the left hand end of the driver 20 is placed in the chuck of the numerical control machine (not shown). The shoulder 27 on piston end 21 of driver 20 abuts left-hand end caps 16 and end pieces 17 (FIG. 2) and keeps piston 21 of driver 20 in body 10. On driver 20 are two opposing flat spots 32 (FIG. 2) which are contacted by end caps 16 and rotate body 10 with driver 20. Piston 21 of driver 20 may move linearly (horizontally in FIG. 4) along it's axis of rotation 19 within the body 10. Piston 21 is biased to the left in the direction of arrow 33 by override die (coil) spring 36 which fits within a cylindrical cavity 37 in piston 21 of driver 20. Driver 20 has three circumferential O-rings 38, 39 and 40 mounted in grooves in piston 21 of driver 20 which seal piston 21 in first body cavity 41 of body 10 and delineate a front chamber or resevoir 42 and a rear or relief chamber 43 (resevoir). Cylindrical sleeve 44, by contacting flange 46 on the piston 21, limits the travel of the piston 21 to the right in the direction of arrow 45 along the axis of rotation 19 into the first body cavity 41.

With reference to FIGS. 4 and 5, cover plates 24 are secured to body 10 to cover bore holes 48, 50, 52, 54 and 56. Mounted in bore hole 54 is a ball check valve for one-way passage of fluid in bore hole 54. The ball check valve is comprised of spherical ball 58 seated in the body member 10 and held in sealing contact by coil spring 60.

Right-hand end cap 12 covers bore holes 62 and 64 and holds valve spool 66 within the second body cavity 67 of body 10. Valve spool 66 is forced to the right in the direction of arrow 45 along the axis of rotation 19 of body 10, FIGS. 4 and 5, by valve spool (coil) spring 68. Two O-rings 70 and 72 are mounted in grooves on valve spool 66 and seal off a cylindrical passageway 74 between the valve spool 66 and the surrounding cylindrical surface of second body cavity 67. Relief pins 76 are mounted in end cap 12 and their heads 78 bear against the end 79 of valve spool 66. The opposite ends of relief pins 76 are thread mounted in cylindrical pin sleeve holder 80.

Mounted on pin sleeve holder 80 is a cylindrical thrust bearing 82. Thrust bearing 82 is attached to valve spool actuator 22. Threaded into valve spool actuator 22 is collapsible extension element 26. The collapsible extension element 26 is composed of mounting piece 84 with a cylindrical extension, head 86, and coil spring 88. The cylindrical extension of mounting piece 84 slideably telescopes into head 86 and is biased at its maximum outward extension by coil spring 88 which surrounds the cylindrical extension. Within head 86 is a lock ring (not shown) which holds the cylindrical extension of mounting piece 84 in head 86.

To assemble the inventive hydraulic stop 100, cylindrical sleeve 44 is first placed within first body cavity 41. Next, override die spring 36 is placed in first body cavity 41. O-rings 38, 39 and 40 are mounted in the grooves on piston 21. Piston 21 is inserted into the first body cavity 41 such that override die spring 36 fits inside of the cylindrical cavity 37 in piston 21. Circumferential O-rings 39 and 40 seal off cylindrical front chamber 42 (resevoir) and O-rings 38 and 39 seal off cylindrical relief chamber 43 (resevoir) between the piston 21 and the inside surface of the first body cavity 41. As piston 21 of driver 20 moves to the right, in FIG. 4, in the direction of arrow 45 the volume of front chamber 42 decreases and volume of rear relief chamber 43 increases. Cylindrical sleeve 34 is then placed in first body cavity 41. While piston 21 is biased to the right, in FIG. 4, in the direction of arrow 45 against override die spring 36, left-hand end caps 16 and left-hand end pieces 17 are affixed by screws 18 to the body 10. As noted, left-hand end caps 16 engage flat spots 32 on driver 20 such that body 10 rotates around axis 19 with driver 20 and at the same time piston 21 of driver 20 may move within the first body cavity 41 along the axis of rotation 19 in a linear direction depending upon circulation of hydraulic fluid within stop 100. Since shoulder 27 on piston 21 abuts left-hand end caps 16 and end pieces 17, piston 21 is held within the first body cavity 41.

Cover plates 24 are then bolted to body 10 covering bore holes 48, 50 and 56. Spherical ball 58 is placed in bore hole 54 followed by coil spring 60. Spring 60 biases ball 58 against the seat in bore hole 54 in body 10 forming a unidirectional check valve. A coverplate 24 is then mounted by bolts 14 covering bore hole 52 and 54.

Next, valve spool spring 68 is placed in the second body cavity 67. O-rings 70 and 72 are mounted on valve spool 66. Spool 66 is then placed in the second body cavity 67 sealing off a cylindrical passageway 74 between valve spool 66 and inside surface of second body cavity 67. Valve spool 66 may move linearly along axis 19 within second body cavity 67 opening and closing passageway 74 from bore hole 52 to bore hole 56. Relief pins 76 are slideably mounted in the right-hand end cap 12, and end cap 12 is bolted to body 10 by bolts 14. Relief pins 76 are threaded into cylindrical pin sleeve holder 80. Bearing 82 is attached to cylindrical pin sleeve holder 80 by retainer ring 92. Valve spool actuator 22 is attached to thrust bearing 82 by retainer ring 93. Thrust bearing 82 permits rotation of the valve spool actuator 22 about axis 19 with respect to body 10.

Hydraulic fluid is inserted into bore hole 46 when the hydraulic stop is in the position of FIG. 4. The hydraulic fluid fills the front chamber 42 (resevoir) as well as the bore holes and passages up to valve spool 66 and the check valve in bore hole 54. Cover plate 24 is then bolted to body 10.

Collapsible extension element 26 is then threaded to valve spool actuator 22. Drill bit 28 is threaded into right-hand end cap 12.

In operation, as seen in FIG. 4, driver 20 moves to the right in the direction of arrow 45 and collapsible extension element 26 engages work piece 30. It is desirable that extension element 26 engage work piece 30 prior to any cutting operation as it makes clean contact with the work piece. If drill 28 has begun to cut a hole in work piece 30, drill chips might interfere with and prevent an accurate measurement of distance to the work piece 30.

Hydraulic fluid is contained in front chamber 42 because fluid cannot pass thru the ball check valve in bore hole 54 and cannot pass beyond bore hole 52 because valve spool 68 is spring biased in the closed position as shown in FIG. 4. Accordingly, the hydraulic fluid provides stiffening to the stop 100 in a lineal direction along axis of rotation 19. Pressure on driver 20 (FIG. 4) collapses coil spring 88 and permits the telescoping of cylindrical head 86 over the cylindrical extension of mounting piece 84 and exposes drill bit 28 to the work piece 30. As noted, the hydraulic fluid contained in front chamber 42 provides a stiffening for the hydraulic stop and linear pressure on driver 20 along axis 19 is transmitted to body 10 and to drill bit 28. Rotation of driver 20 results in rotation of drill bit 28 and cutting of a hole in work piece 30. As lineal movement along axis 19 is applied by the numerical control machine, on the driver 20 coil spring 88 continues to collapse permitting further telescoping of head 86 over the cylindrical extension of mounting piece 84 and additional exposure of drill bit 28. When coil spring 88 is completely collapsed further pressure on extension element 86 transmits force through collapsed spring 88 to mounting piece 84 to valve spring actuator 22. Valve spring actuator 22 transmits this force along axis 19 to thrust bearing 82 to cylindrical pin sleeve holder 80. This force is transmitted frm holder 80 thru relief pins 76 to end 79 to valve spool 66. The force on valve spool 66 collapses valve spool spring 68 and valve spool 66 moves lineally along axis 19 to the left in the direction of arrow 33 opening cylindrical passageway 74 (FIG. 5) between bore hole 52 and bore hole 56. Once this passageway 74 is open hydraulic fluid can pass from front chamber 42 through bore holes 56, 64 and 48 to relief chamber 43 thereby releasing the hydraulic stiffening of the inventive stop 100 permitting piston 21 to move to the right in the direction of arrow 45 into first body cavity 41. Releasing the hydraulic stiffening of the stop 100 disengages the force transmitted along axis 19 to drill bit 28 and limits the penetration of drill bit 28 into work piece 30.

In the event the spindle of the numerical control machine inadvertently pushes driver 20 lineally along axis 19 beyond the assumed stroke, valve spool 66 can further compresses valve spool spring 68 and drive 20 can further compress override die spring 36. This compression of springs 36 and 66 absorbs the undesired lineal movement of the numerical control machine along axis 19 in direction of arrow 45 without placing undue force on work piece 30, tool, or holding fixture.

When the stroke of the numerical control machine has been completed and the spindle of the numerical control machine (not shown) reverses lineal directions along the axis 19 in the direction of arrow 33 away from part 30, hydraulic stop 100 automatically resets itself to perform the next drilling operation. When pressure on valve spool spring 68 and override die spring 36 are relieved the hydraulic reset cycle begins. Valve spool spring 68 forces the valve spool 66 to the right (FIG. 4) in direction of arrow 45 closing off bore hole 52. Piston 21 is forced to the left in the direction of arrow 33 in first body cavity 41 by override die spring 36. The fluid in relief chamber 43 is forced back through bore holes 48, 64 and 56 into cylindrical passageway 74 and past the ball check valve into bore holes 54, 62 and 46 and into front chamber 42. The travel of piston 21 to the left in the direction of arrow 33 in first body cavity 41 is terminated when shoulder 27 abuts left hand end caps 16 and end pieces 17.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. An automatic hydraulic stop for use with a numerical control machine and drill bit to limit the depth a drill bit penetrates a work piece comprising:
    an elongated driver interconnected at its first end to said numerical control machine to rotate about an axis, said driver having a piston on its second end;
    a body member surrounding and attached to the piston end of said driver to rotate with said driver about said axis and transmit rotary motion to said drill bit affixed to said body member, said piston end of said driver located in a first cavity within said body member defining first and second chambers, the volumes of said chambers varing proportionally with the location of said piston in said cavity;
    hydraulic fluid to fill said first chamber to transmit a force lineally along said axis from said driver to said drill bit;
    spring means interconnected between said body member and said driver to bias said piston end of said driver out of said body member lineally along said axis enlarging the volume of said first chamber and decreasing the volume of said second chamber;
    first valve means permitting unidirectional flow of hydraulic fluid between said chambers;
    second valve means designed to open at a predetermined force permitting the flow of hydraulic fluid in the opposite direction of the first valve means between said chambers, and
    sensing means attached to said body member to contact a work piece to be drilled and transmit a predetermined force to said second valve means thereby opening said valve means when the drill bit has penetrated said work piece to the prescribed depth.

2. The automatic stop of claim 1 wherein said second valve means comprises:
    a spring biased valve spool mounted within a second cavity in said body member defining a cylindrical passageway for movement along said axis when a predetermined force is applied by said sensing means to open a passageway from said first chamber to said second chamber.

3. The automatic stop of claim 2 wherein said first valve means is a spring biased ball check valve.

4. The automatic stop of claim 3 wherein said spring means is a coil spring mounted in said first cavity biasing piston end of said driver out of said body member.

* * * * *

UNITED STATES PATENT OFFICE
CERTIFICATE OF CORRECTION

PATENT NO. : 4,273,481
DATED : June 16, 1981
INVENTOR(S) : John E. Corley et al.

It is certified that error appears in the above-identified patent and that said Letters Patent are hereby corrected as shown below:

Col. 1, Line 3, insert the following paragraph:

--The Government has rights in this invention pursuant to Contract Number F33657-77-C-0200 awarded by the Department of the Air Force.--

Signed and Sealed this

First Day of December 1981

[SEAL]

Attest:

GERALD J. MOSSINGHOFF

Attesting Officer

Commissioner of Patents and Trademarks